US012695661B2

(12) United States Patent　　(10) Patent No.:　US 12,695,661 B2
Ogihara et al.　　　　　　　　　(45) Date of Patent:　　　Jul. 28, 2026

(54) PROTOCOL ANALYZER, NON-TRANSITORY COMPUTER-READABLE STORAGE MEDIUM IN WHICH PROTOCOL ERROR DETECTION PROGRAM IS RECORDED, AND PROTOCOL ERROR DETECTION METHOD

(71) Applicant: NEC Corporation, Tokyo (JP)

(72) Inventors: Yusuke Ogihara, Tokyo (JP); Atsushi Nakata, Tokyo (JP); Takashi Usukura, Tokyo (JP); Yuji Simoyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 397 days.

(21) Appl. No.: 18/280,613

(22) PCT Filed: Mar. 11, 2021

(86) PCT No.: PCT/JP2021/009897
§ 371 (c)(1),
(2) Date: Sep. 6, 2023

(87) PCT Pub. No.: WO2022/190329
PCT Pub. Date: Sep. 15, 2022

(65) Prior Publication Data
US 2024/0154857 A1　　May 9, 2024

(51) Int. Cl.
H04L 41/0686　　(2022.01)
H04L 41/069　　(2022.01)
(Continued)

(52) U.S. Cl.
CPC ........ H04L 41/0686 (2013.01); H04L 41/069 (2013.01); H04W 24/04 (2013.01); H04W 80/04 (2013.01)

(58) Field of Classification Search
CPC ............... H04L 41/0686; H04L 41/069; H04L 43/0847; H04L 43/18; H04W 24/04; H04W 80/04; H04W 24/08
See application file for complete search history.

(56) References Cited

U.S. PATENT DOCUMENTS

2003/0115328 A1 *　6/2003　Salminen ............ H04L 63/0254
709/225
2012/0208562 A1　8/2012　Wilkin et al.
(Continued)

FOREIGN PATENT DOCUMENTS

JP　　2014-508469 A　　4/2014
WO　　2016/042731 A1　　3/2016
WO　　2020/217989 A1　　10/2020

OTHER PUBLICATIONS

International Search Report for PCT Application No. PCT/JP2021/009897, mailed on Jun. 1, 2021.

*Primary Examiner* — Schquita D Goodwin
(74) *Attorney, Agent, or Firm* — Sughrue Mion, PLLC

(57) ABSTRACT

A protocol analyzer of the present disclosure includes a protocol check circuit that relays a control plane and a user plane between a radio unit and a base band unit while performing detection of an error in the control plane and the user plane, and a failure detection packet generation unit configured to generate a failure detection packet based on error factor information generated by the protocol check circuit in response to detection of the error in the control plane and the user plane and based on the ether head of the control plane or the user plane in which the error has been detected and a timestamp, in which the protocol check circuit interprets the control plane and the user plane based on information in a management plane that determines transmission-reception conditions for the control plane and the user plane between the radio unit and the base band unit.

9 Claims, 4 Drawing Sheets

(51) Int. Cl.
   *H04W 24/04*     (2009.01)
   *H04W 80/04*     (2009.01)

(56)                References Cited

U.S. PATENT DOCUMENTS

| | | | |
|---|---|---|---|
| 2016/0248623 A1* | 8/2016 | Matsuura | H04L 12/437 |
| 2017/0279670 A1 | 9/2017 | Hata | |
| 2018/0007511 A1* | 1/2018 | Nallampatti Ekambaram | H04W 4/40 |
| 2019/0116535 A1* | 4/2019 | Szilagyi | H04W 24/10 |
| 2021/0409335 A1* | 12/2021 | Zhu | H04L 47/24 |
| 2022/0182172 A1* | 6/2022 | Nath | H04L 5/0053 |
| 2022/0201796 A1 | 6/2022 | Nakata et al. | |
| 2023/0171592 A1* | 6/2023 | Han | H04W 8/20 370/328 |
| 2023/0180055 A1* | 6/2023 | Gorain | H04W 28/06 370/329 |
| 2024/0129221 A1* | 4/2024 | Miyoshi | G06F 8/423 |

* cited by examiner

1

PROTOCOL ANALYZER, NON-TRANSITORY COMPUTER-READABLE STORAGE MEDIUM IN WHICH PROTOCOL ERROR DETECTION PROGRAM IS RECORDED, AND PROTOCOL ERROR DETECTION METHOD

This application is a National Stage Entry of PCT/JP2021/009897 filed on Mar. 11, 2021, the contents of all of which are incorporated herein by reference, in their entirety.

TECHNICAL FIELD

The present disclosure relates to a protocol analyzer, a non-transitory computer-readable storage medium in which a protocol error detection program is recorded, and a protocol error detection method, and in particular to a protocol analyzer used for analysis of protocols used in O-RAN (Open Radio Access Network), a non-transitory computer-readable storage medium in which a protocol error detection program is recorded, and a protocol error detection method.

BACKGROUND ART

In some radio communication systems, a radio unit configured to perform radio frequency processing and a base band unit configured to perform baseband frequency processing are installed as separate devices on a base station side, and a communication line connects the radio unit and the base band unit with each other. Rules for these communication systems are formulated by the Open-Radio Access Network (O-RAN) Alliance, etc. Further, in O-RAN, a radio unit is referred to as O-RU (O-RAN Radio Unit) and a base band unit is referred to as O-DU (O-RAN Distributed Unit). In such communication systems, the Management Plane (M-Plane), the Synchronization Plane (S-Plane), the Control Plane (C-Plane), and the User Plane (U-Plane) are transmitted and received to and from a radio unit and a base band unit. Patent Literature 1 discloses a technique for transmitting and receiving information to and from a radio unit and a base band unit via an intermediate node.

The communication device described in Patent Literature 1 includes an information obtaining unit configured to obtain management information indicating correspondence relationship between an address of an intermediate node and an address of a radio unit performing radio frequency processing, the intermediate node being a node transmitting signals between the radio unit and a radio access network node communicating with one or more user equipment via the radio unit, the address of the intermediate node being used by the intermediate node to connect to the radio unit for communication of a control/user plane, the address of the radio unit being used by the radio unit to connect to the intermediate node for communication of the control/user plane; and a communication processing unit configured to transmit the management information to a controller controlling a configuration of the radio unit.

Citation List

Patent Literature

Patent Literature 1: International Publication No. WO2020/217989

2

SUMMARY OF INVENTION

Technical Problem

In O-RAN, however, the management plane is encrypted according to an encryption protocol, and so even if a packet is retrieved by an intermediate node, the contents of the information in the management plane cannot be read. Also, since synchronization/control/user plane has a packet format based on the configuration information sent and received by the management plane, even if a packet is retrieved by an intermediate node, the contents of the packet cannot be analyzed without having the configuration information in the management plane. Further, the technique described in Patent Literature 1 does not mention analyzing the contents of packet information, and the intermediate node described in Patent Literature 1 has a problem that the control/user plane error cannot be detected.

Solution to Problem

According to an aspect of the present disclosure, a protocol analyzer includes a protocol check circuit that relays a control plane and a user plane between a radio unit and a base band unit while performing detection of an error in the control plane and the user plane that are transmitted and received to and from the radio unit configured to perform radio frequency processing and the base band unit configured to perform baseband frequency processing; and a failure detection packet generation unit configured to generate a failure detection packet based on error factor information generated by the protocol check circuit in response to detection of the error in the control plane and the user plane and based on an ether header of the control plane or the user plane in which the error has been detected and a timestamp, in which the protocol check circuit interprets the control plane and the user plane based on information in a management plane that determines transmission-reception conditions for the control plane and the user plane between the radio unit and the base band unit.

According to an aspect of the present disclosure, a non-transitory computer-readable storage medium in which an error detection program executed by a protocol analyzer that includes an operation unit configured to execute the program is recorded, the program adapted to detect a protocol error by performing: protocol check processing for relaying a control plane and a user plane between a radio unit and a base band unit while detecting an error in the control plane and the user plane transmitted and received to and from the radio unit configured to perform radio frequency processing and the base band unit configured to perform baseband frequency processing; and failure detection packet generation processing for generating a failure detection packet based on error factor information generated in the protocol check processing in response to detection of the error in the control plane and the user plane, and based on an ether header of the control plane or the user plane in which the error has been detected and a timestamp, in which in the protocol check processing, the control plane and the user plane are interpreted based on information in a management plane that determines transmission-reception conditions for the control plane and the user plane between the radio unit and the base band unit.

According to an aspect of the present disclosure, a protocol error detection method for detecting an error in a control plane and a user plane that are transmitted and received to and from a radio unit configured to perform radio frequency processing and a base band unit configured to perform base band frequency processing, includes performing protocol check processing for relaying a control plane and a user plane between a radio unit and a base band unit while performing detection of an error in the control plane and the user plane; and performing failure detection generation processing for generating a failure detection packet based on error factor information generated in the protocol check processing in response to detection of the error in the control plane and the user plane, and based on an ether header of the control plane or the user plane in which the error has been detected and a timestamp, in which in the protocol check processing, the control plane and the user plane are interpreted based on information in a management plane that determines transmission-reception conditions for the control plane and the user plane between the radio unit the base band unit.

Advantageous Effects of Invention

According to the present disclosure, a protocol analyzer, a non-transitory computer-readable storage medium in which a protocol error detection program is recorded, and a protocol error detection method are each adapted to facilitate error analysis by detecting an error in a control/user plane.

EXAMPLE EMBODIMENT

Figure 1:
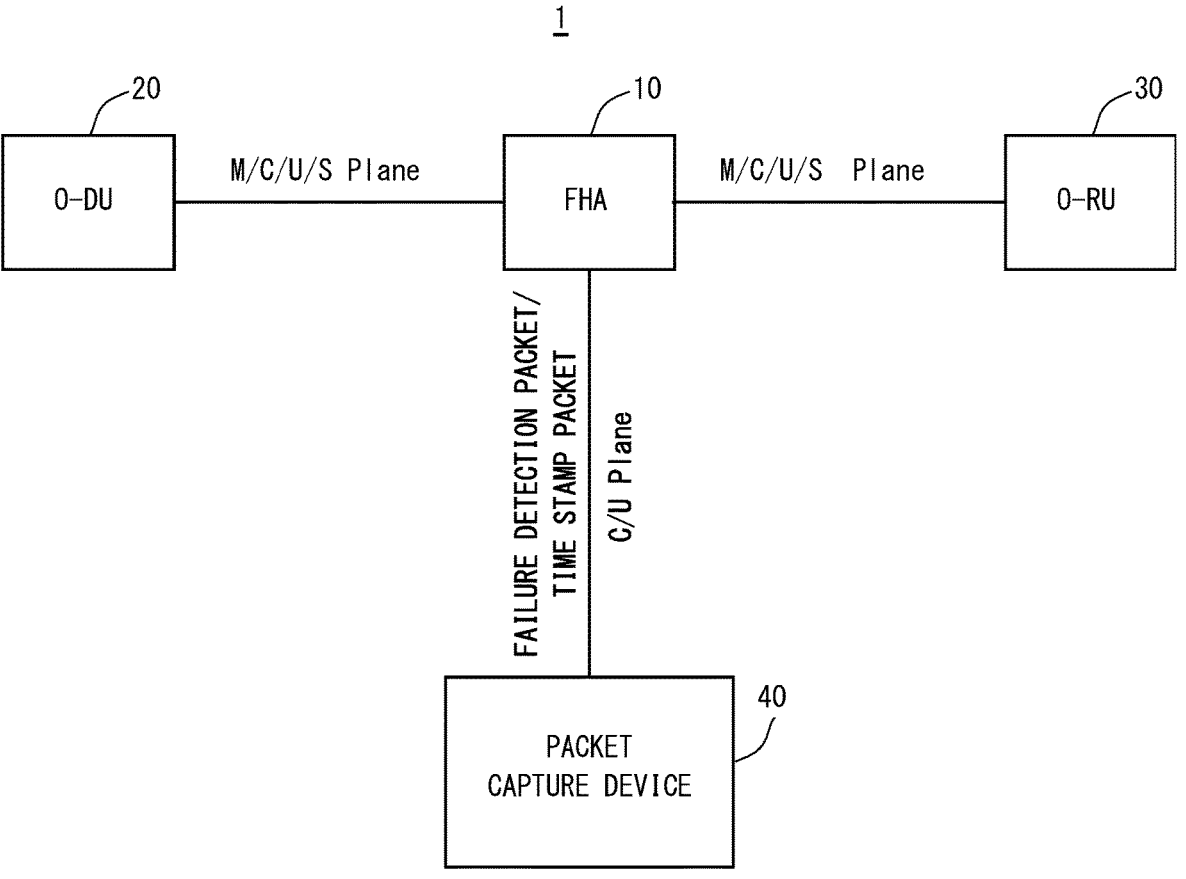
FIG. 1 is a block diagram of a communication system according to a first example embodiment.

The following descriptions and drawings have been omitted and simplified where appropriate for the sake of clarity. In addition, each element/structural component illustrated in the drawings as a functional block that performs various processes can be composed of a CPU (Central Processing Unit), a memory, and other circuits in terms of hardware configuration, and can be realized by a program loaded in the memory, etc. in terms of software. Therefore, it is understood by a person skilled in the art that these functional blocks can be realized in various forms by hardware alone, software alone, or a combination thereof, and it is not limited to any one of them. In each of the drawings, the same elements are denoted by the same reference symbols, and duplicate descriptions are omitted as necessary.

In addition, the programs described above can be stored using any type of non-transitory computer-readable media and provided to a computer. Non-transitory computer-readable media include any type of tangible storage media. Examples of non-transitory computer-readable media include magnetic recording media (e.g., flexible disks, magnetic tapes, hard disk drives), magneto-optical recording media (e.g., magneto-optical disks), CD-ROM (Read Only Memory), CD-R, CD-R/W, and semiconductor memory (e.g., mask ROM, PROM (Programmable ROM), EPROM (Erasable PROM), flash ROM, and RAM (Random Access Memory)). Further the programs may also be provided to a computer by any type of non-transitory computer-readable media. Examples of non-transitory computer-readable media include electrical signals, optical signals, and electromagnetic waves. Non-transitory computer-readable media can provide programs to a computer via a wired communication line, such as electric wires and optical fibers, or via a wireless communication line.

First Example Embodiment

FIG. 1 shows a block diagram of a communication system 1 according to a first example embodiment. As shown in FIG. 1, the communication system 1 according to the first example embodiment includes a protocol analyzer 10, a radio unit 20, a base band unit 30, and a packet capture device 40.

The radio unit 20 is O-RU (O-RAN Radio Unit) defined by O-RAN (Open Radio Access Network) Alliance. The base band unit 30 is O-DU (O-RAN Distributed Unit) defined by O-RAN Alliance. The packet capture device 40 is a device that captures and visualizes error-rated packets (e.g., Ether packets) in the protocol analyzer 10. Then, in the communication system 1 according to the first example embodiment, the protocol analyzer 10 that relays the Management Plane (M-Plane), the Synchronization Plane (S-Plane), the Control Plane (C-Plane), and the User Plane (U-Plane) that are transmitted and received to and from the radio unit 20 and the protocol analyzer 10 are arranged. While relaying signals of each plane between the radio unit 20 and the base band unit 30, the protocol analyzer 10 analyzes the contents of the control plane and the user plane to detect an error in these planes.

When a protocol error is detected in the management/control/user/synchronization plane transmitted/received between the radio unit 20 and the base band unit 30, the communication system 1 according to the first example embodiment uses the protocol analyzer 10 to generate and output a failure detection packet based on the error factor/timestamp. By checking the failure detection packet, it is possible to identify the error factor without analyzing a plurality of log data in which an enormous amount of packets are captured. Next, details of the protocol analyzer 10 will be described.

The protocol analyzer 10 can execute a protocol error detection program on a dedicated hardware or on a microcontroller equipped with an operation unit capable of executing the program. In the following description, an example of a configuration of the protocol analyzer 10 in which a dedicated hardware is used will be described.

Figure 2:
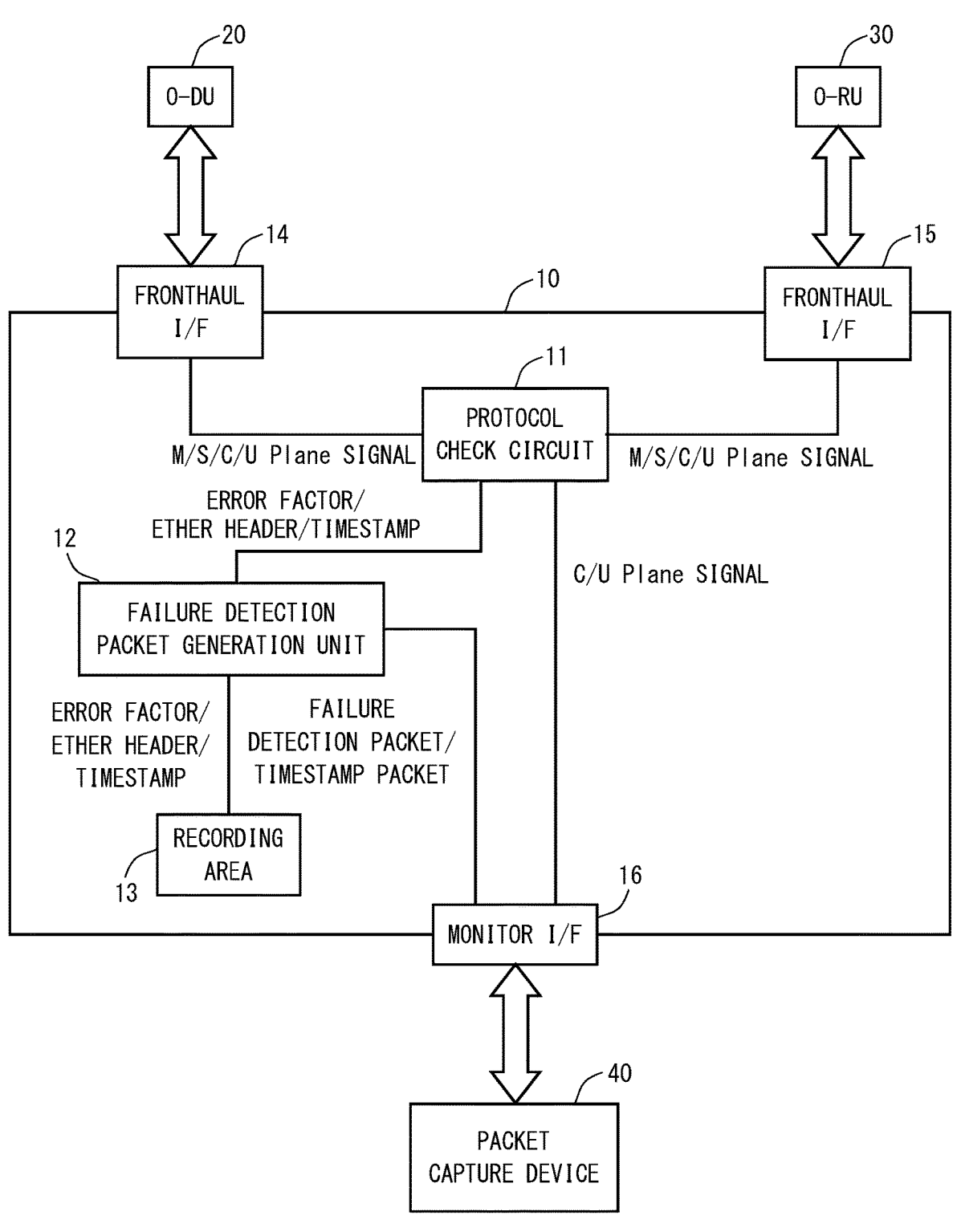
FIG. 2 is a block diagram of a protocol analyzer according to the first example embodiment.

FIG. 2 shows a block diagram of the protocol analyzer 10 according to the first example embodiment. As shown in FIG. 2, the protocol analyzer 10 includes a protocol check circuit 11, a failure detection packet generation unit 12, a recording area 13, fronthaul interfaces 14, 15, and a monitor interface 16. The fronthaul interface 14 is a communication interface with the radio unit 20 and the fronthaul interface 15 is a communication interface with the base band unit 30. The monitor interface 16 is a communication interface with the packet capture device 40.

Further, the protocol check circuit 11 relays the control plane and the user plane between the radio unit 20 and the base band unit 30 while performing error detection. The protocol check circuit 11 also performs detection of an error in the control plane and the user plane transmitted and received to and from the radio unit 20 that performs radio frequency processing and the base band unit 30 that performs base band frequency processing. In this error detection processing, the protocol check circuit 11 interprets the control plane and the user plane based on the information in a management plane that determines the transmission-reception conditions for the control plane and the user plane between the radio unit 20 and the base band unit 30.

More specifically, the protocol check circuit 11 performs signal processing with respect to the control plane and the user plane using the configuration information indicated by the management plane. The protocol check circuit 11 also performs error detection by seeing the header of the control plane and the user plane C/U-Plane. To be more specific, the aforementioned error handling includes having the protocol check circuit 11 check the values of TransportLayer and ApplicationLayer of the eCPRI (evolved Common Public Radio Interface) format. Here, the order, the size, the format, and the parameter settings of the data are checked for normality. Then, in a case where the protocol check circuit 11 detects an error, it notifies the failure detection packet generation unit 12 of the error factor, the ether head of the control plane or the user plane in which the error has been detected, and the timestamp. In the communication system 1 according to the first example embodiment, the analysis accuracy is improved by including the ether header and the timestamp in the same failure detection packet.

The failure detection packet generation unit 12 generates a failure detection packet based on the error factor information generated by the protocol check circuit 11 in response to detection of an error in the control plane and the user plane, and based on the ether header of the control plane or the user plane in which the error has been detected and a timestamp. The failure detection packet generation unit 12 then transmits the generated failure detection packet to the packet capture device 40 via the monitor interface 16.

Further, the protocol analyzer 10 has the recording area 13. The failure detection packet generation unit 12 then records, in the recording area 13, the error factor information, the ether header of the control plane or the user plane in which the error has been detected and a timestamp.

Further, in a case where no error is detected in the control plane and the user plane, the protocol check circuit 11 periodically transmits the ether header of the control plane or the user plane and a timestamp to the failure detection packet generation unit 12. Then, the failure detection packet generation unit 12 periodically generates the timestamp packets using the ether header of the control plane or the user plane and the timestamp. This timestamp packet is transmitted to the packet capture device 40 via the monitor interface 16. By referring to this timestamp packet, the difference between the timestamp in the protocol analyzer and the time in the packet capture device 40 can be clarified.

Here, in the protocol analyzer 10 according to the first example embodiment, several methods can be given for the transmission method of the failure detection packet and the timestamp packet. Here, an example of the transmission method of the failure detection packet and the timestamp packet will be described below.

Figure 3:
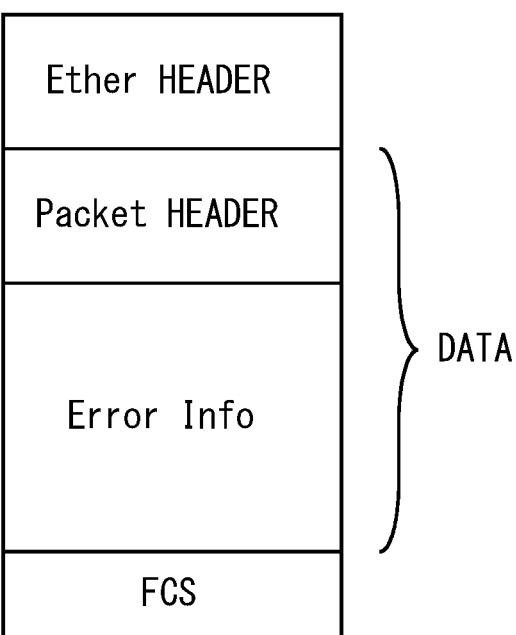
FIG. 3 is a diagram illustrating a format of a failure detection packet generated by a protocol analyzer according to the first example embodiment.

In a first example, every time the failure detection packet generation unit 12 receives the error factor information from the protocol check circuit 11, it generates a failure detection packet and transmits it to the packet capture device 40. FIG. 3 shows an example of the format of the failure detection packet in the case of the first example. As shown in FIG. 3, the failure detection packet consists of an ether header unique to the failure detection packet, a packet header indicating that it is a failure detection packet, error information in which the error factor, the ether header of the plane in which the error has been detected, and timestamp information are stored, and the FCS (Frame Check Sequence), which is an error detection code added to the data when it is transmitted to check for occurrence of an error in the data in the process of communication. In the format shown in FIG. 3, the packet header and the error information become the data part of the failure detection packet.

In a second example, the failure detection packet generation unit 12 generates a number of the failure detection packets equal to the number of errors that are detected at the same timing by the protocol check circuit. In this case, the failure detection packets generated by the failure detection packet generation unit 12 are the same as those shown in FIG. 3.

In a third example, the failure detection packet generation unit 12 generates a failure detection packet upon a request from the packet capture device 40. In this case, the failure detection packet generation unit 12 sequentially records information such as the error factor on which the failure detection packet is based in the recording area 13, generates a failure detection packet based on the error factor information recorded in the recording area 13 upon a request from the packet capture device 40, and transmits the failure detection packet to the packet capture device 40.

Figure 4:
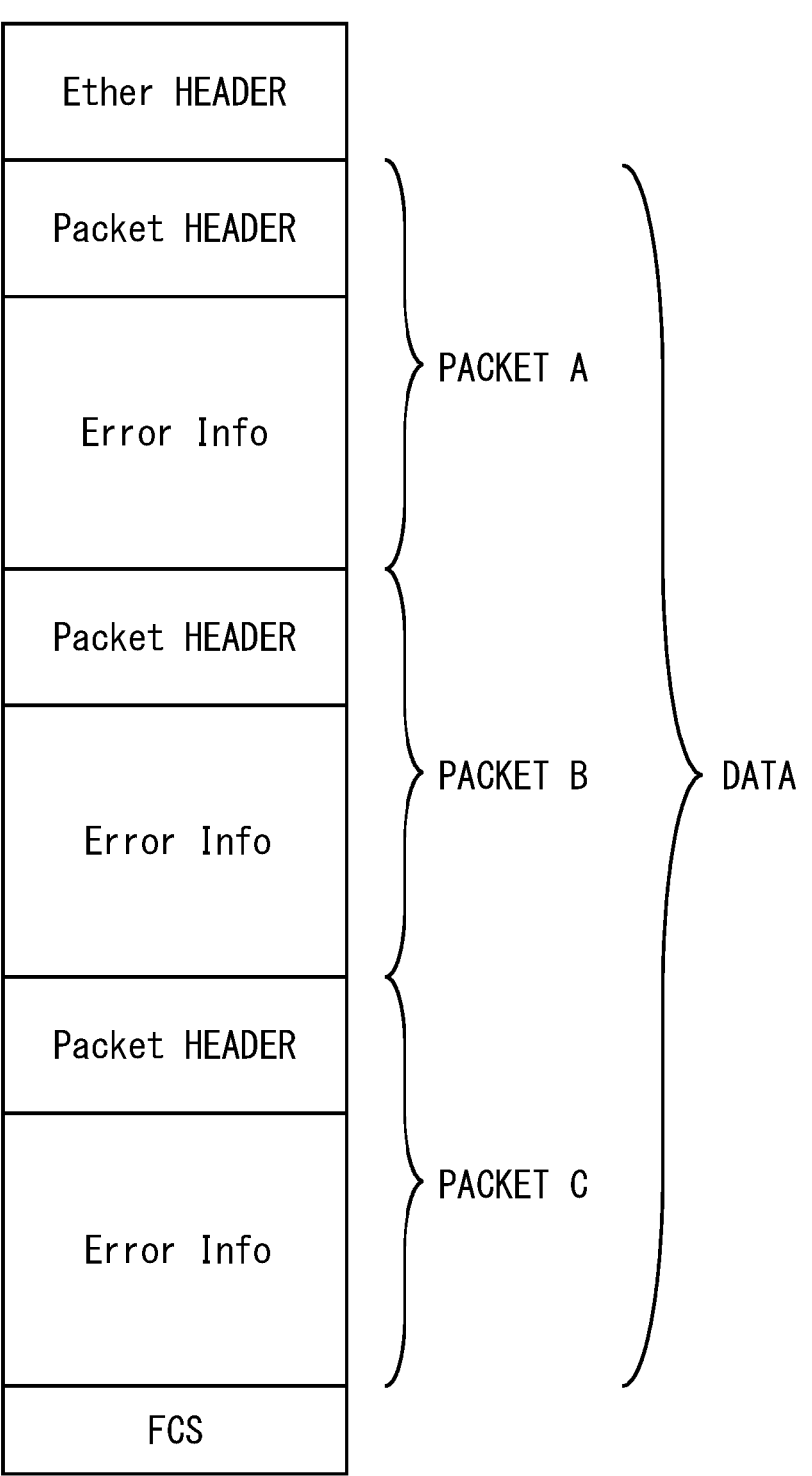
FIG. 4 is a diagram illustrating a format of a failure detection packet when a plurality of error factors are included in the failure detection packet generated by the protocol analyzer according to the first example embodiment.

In a fourth example, the failure detection packet generation unit 12 multiplexes the error factor information it has received within a certain period, the control plane or the user plane in which the error has been detected, and the timestamp and records the multiplexed data in the recording area 13. In this case, the failure detection packet generation unit 12 generates a failure detection packet, in which information such as a plurality of error factors are multiplexed, periodically or upon a request from the packet capture device 40 and transmits the generated failure detection packet to the packet capture device 40. FIG. 4 shows a diagram illustrating a format of a failure detection packet when a plurality of error factors are included in a failure detection packet generated by the protocol analyzer according to the first example embodiment. In the case shown in FIG. 4, when a plurality of error factors are multiplexed, packets (e.g., packets A through C) consisting of a packet header and a pair of error information for each error factor are generated, and the data of the plurality of packets to be multiplexed are included in a region sandwiched between a pair of one ether header and FCS.

Note that the packet generation method described in the first to fourth examples can also be applied to timestamp packets. Also, a timestamp packet and a failure detection packet can be multiplexed into a single packet.

From the above description, in the protocol analyzer 10 according to the first example embodiment, the plane causing communication failure can be recorded as the history of the failure detection packet including the error factor, the ether header and the timestamp. Thus, in the communication system 1 according to the first example embodiment, it is possible to identify, in a short time, the error occurrence point from the plurality of log data in which an enormous amount of packets are captured.

Analyzing the cause of a failure without using the protocol analyzer 10 requires a lot of work and effort. When the protocol analyzer 10 is not used, first, based on the error event information, the device settings of the radio unit 20, the internal failure information log, and the fronthaul log are matched with one another, and then the device settings of the base band unit 30, the internal failure information log, and the fronthaul log are matched. Sequentially, inconsistencies in the operation of the radio unit 20 and the base band unit 30 must be discovered. Such a process took several hours to perform when it is necessary to refer to a plurality of log data in which an enormous amount of packets are captured.

On the other hand, by using the protocol analyzer 10 according to the first example embodiment, the scope of investigation can be limited by including the failure detection packets before and after the occurrence of an event. Also, by including the time of PTP synchronization in the failure detection packets, analysis can be performed on a unified time axis (even the difference can be known if the time is off) by the vendors of the radio unit 20 and the base band unit 30.

Furthermore, in recent years, an extremely high-rate interface with a maximum speed of 25 Gbps has been used, which makes it difficult to discern the timing of occurrence of an error due to the enormous amount of packets, but such error analysis can be facilitated by using the protocol analyzer 10 according to the first example embodiment.

It should be noted that present disclosure is not limited to the above example embodiments and can be changed as appropriate without departing from the gist of the present disclosure.

REFERENCE SIGNS LIST

1 COMMUNICATION SYSTEM
10 PROTOCOL ANALYZER
11 PROTOCOL CHECK CIRCUIT
12 FAILURE DETECTION PACKET GENERATION UNIT
13 RECORDING AREA
14 FRONTHAUL INTERFACE
15 FRONTHAUL INTERFACE
16 MONITOR INTERFACE
20 RADIO UNIT
30 BASE BAND UNIT
40 PACKET CAPTURE DEVICE

What is claimed is:

1. A protocol error detection method for detecting an error in a control plane and a user plane that are transmitted and received to and from a radio unit configured to perform radio frequency processing and a base band unit configured to perform base band frequency processing, the method comprising:

performing protocol check processing for relaying a control plane and a user plane between a radio unit and a base band unit while performing detection of an error in the control plane and the user plane; and performing failure detection generation processing for generating a failure detection packet based on error factor information generated in the protocol check processing in response to detection of the error in the control plane and the user plane, and based on an ether header of the control plane or the user plane in which the error has been detected and a timestamp, wherein in the protocol check processing, the control plane and the user plane are interpreted based on information in a management plane that determines transmission-reception conditions for the control plane and the user plane between the radio unit the base band unit, and an analyzer includes a recording area for recording the error factor information, the ether header of the control plane or the user plane in which the error has been detected, and the timestamp.

2. A protocol analyzer comprising:

at least one memory that is configured to store instructions; and at least one processor that is configured to execute the instructions to:

relay a control plane and a user plane between a radio unit and a base band unit while performing detection of an error in the control plane and the user plane that are transmitted and received to and from the radio unit configured to perform radio frequency processing and the base band unit configured to perform baseband frequency processing; and generating a failure detection packet based on error factor information generated in response to detection of the error in the control plane and the user plane and based on an ether header of the control plane or the user plane in which the error has been detected and a timestamp, wherein the control plane and the user plane are interpreted based on information in a management plane that determines transmission-reception conditions for the control plane and the user plane between the radio unit and the base band unit, and the analyzer includes a recording area for recording the error factor information, the ether header of the control plane or the user plane in which the error has been detected, and the timestamp.

3. The protocol analyzer according to claim 2, further comprising transmitting the failure detection packet generated based on the information recorded in the recording area to a packet capture device upon a request from the packet capture device.

4. The protocol analyzer according to claim 2, further comprises multiplexing and recording, in the recording area, the ether header of the control plane or the user plane in which the error has been detected and the timestamp.

5. The protocol analyzer according to claim 2, further comprising generating a number of the failure detection packets equal to the number of errors that are detected at the same timing.

6. The protocol analyzer according to claim 2 wherein in the case where no error is detected in the control plane and the user plane, the at least one processor is further configured to execute the instructions to:

periodically transmit the ether header of the control plane or the user plane and the timestamp, and periodically generate timestamp packets using the ether header of the control plane or the user plane and the timestamp.

7. The protocol analyzer according to claim 2, further comprising transmitting the control plane and the user plane to the packet capture device in the order in which they are received.

8. The protocol analyzer according to claim 2 wherein the control plane, the user plane, and the management plane are signals defined in an O-RAN (Open Radio Access Network) alliance.

9. A non-transitory computer-readable storage medium in which an error detection program executed by a protocol analyzer that includes at least one processor configured to execute the program is recorded, the program adapted to detect a protocol error by performing:

protocol check processing for relaying a control plane and a user plane between a radio unit and a base band unit while detecting an error in the control plane and the user plane transmitted and received to and from the radio unit configured to perform radio frequency processing and the base band unit configured to perform baseband frequency processing; and failure detection packet generation processing for generating a failure detection packet based on error factor information generated in the protocol check processing in response to detection of the error in the control plane and the user plane, and based on an ether header of the control plane or the user plane in which the error has been detected and a timestamp, wherein in the protocol check processing, the control plane and the user plane are interpreted based on information in a management plane that determines transmission-reception conditions for the control plane and the user plane between the radio unit and the base band unit, and the analyzer includes a recording area for recording the error factor information, the ether header of the control plane or the user plane in which the error has been detected, and the timestamp.

\* \* \* \* \*